US012350931B2

(12) United States Patent
Takayama et al.

(10) Patent No.: US 12,350,931 B2
(45) Date of Patent: Jul. 8, 2025

(54) LIQUID DROPLET EJECTING APPARATUS

(71) Applicant: BROTHER KOGYO KABUSHIKI KAISHA, Nagoya (JP)

(72) Inventors: Haruhisa Takayama, Nagoya (JP); Atsushi Ito, Nagoya (JP); Yuya Kato, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 160 days.

(21) Appl. No.: 18/181,349

(22) Filed: Mar. 9, 2023

(65) Prior Publication Data

US 2023/0311484 A1 Oct. 5, 2023

(30) Foreign Application Priority Data

Apr. 1, 2022 (JP) ................................ 2022-061646

(51) Int. Cl.
*B41J 2/045* (2006.01)
*B41J 2/165* (2006.01)
*B41J 2/21* (2006.01)
*B41J 25/316* (2006.01)

(52) U.S. Cl.
CPC ......... *B41J 2/04526* (2013.01); *B41J 2/0451* (2013.01); *B41J 2/04561* (2013.01); *B41J 2/04581* (2013.01); *B41J 2/16514* (2024.05); *B41J 2/2142* (2013.01); *B41J 25/316* (2013.01)

(58) Field of Classification Search
CPC .................................................... B41J 2/04526
See application file for complete search history.

(56) References Cited

U.S. PATENT DOCUMENTS

| | | | | |
|---|---|---|---|---|
| 4,323,905 A * | 4/1982 | Reitberger | B41J 2/125 347/19 |
| 6,575,550 B1 * | 6/2003 | Steinfield | B41J 2/0456 347/19 |
| 2003/0071984 A1 * | 4/2003 | Teramae | B41J 2/125 356/28 |
| 2003/0122886 A1 * | 7/2003 | Adkins | B41J 2/125 347/19 |
| 2006/0101926 A1 * | 5/2006 | Komatsu | B41J 2/125 73/865.9 |
| 2020/0189267 A1 * | 6/2020 | Hori | B41J 2/16532 |

FOREIGN PATENT DOCUMENTS

| | | | |
|---|---|---|---|
| JP | 2010-131827 A | 6/2010 | |
| JP | 2012121298 A * | 6/2012 | B41J 2/16547 |

* cited by examiner

*Primary Examiner* — Shelby L Fidler
(74) *Attorney, Agent, or Firm* — Merchant & Gould P.C.

(57) ABSTRACT

A liquid droplet ejecting apparatus includes: an ejecting head made of metal and having an ejection surface; an electrode which moves relative to the ejection surface; a voltage source generating a potential difference between the ejecting head and the electrode; an electric current detector detecting an electric current between the ejecting head and the electrode; and a controller. The controller is configured to: calculate a flying speed of the liquid droplet based on a first distance between the ejecting head and the electrode and a time during which the electric current flows between the ejecting head and the electrode; and calculate an ejection bending amount, based on a time after the liquid droplet is ejected from the ejecting head in a state that the ejection surface and the electrode are apart from each other by a second distance and until the liquid droplet lands on the electrode.

14 Claims, 9 Drawing Sheets

LIQUID DROPLET EJECTING APPARATUS

REFERENCE TO RELATED APPLICATIONS

This application claims priority from Japanese Patent Application No. 2022-061646 filed on Apr. 1, 2022. The entire content of the priority application is incorporated herein by reference.

BACKGROUND ART

Conventionally, in an ejection head provided with a nozzle configured to eject droplets of liquid (liquid droplets), there is a technique of detecting an ejecting characteristic of the nozzle. For example, there is a publicly known liquid droplet ejecting apparatus provided with: a first electrode which makes a potential of a liquid droplet ejected from the nozzle to be a predetermined potential: a second electrode of which potential is made to be different from the predetermined potential; and a detector which detects a change in the potential of the first electrode or the second electrode in a case that the liquid droplet is ejected from the nozzle. According to this configuration, a flying speed of the liquid droplet ejected from the nozzle is detected based on the detected change in the potential.

DESCRIPTION

It is difficult, however, to detect any ejection failure (unsatisfactory ejection) of the nozzle highly precisely only with the flying speed of the liquid droplet ejected from the nozzle. Accordingly, there is such a possibility that a determination of the ejection failure might be made erroneously.

In view of the above-described situation, an object of the present disclosure is to provide a liquid droplet ejecting apparatus capable of detecting the ejection failure highly precisely than in the conventional technique.

According to an aspect of the present disclosure, there is provided a liquid droplet ejecting apparatus comprising: an ejecting head made of metal and having an ejection surface, the ejection surface being formed with a nozzle hole configured to cause a liquid droplet to be ejected onto a print medium; an electrode configured to move relative to the ejection surface; a voltage source configured to generate a potential difference between the ejecting head and the electrode; an electric current detector configured to detect an electric current flowing between the ejecting head and the electrode; and a controller, wherein the controller is configured to: calculate a flying speed of the liquid droplet based on a first distance between the ejecting head and the electrode and a time, during which the electric current flows in a case that the liquid droplet is ejected by the ejecting head in a state of the potential difference being generated by the voltage source between the ejecting head and the electrode; and calculate an ejection bending amount with respect to a normal flying direction of the liquid droplet, based on a time after the liquid droplet is ejected from the ejecting head in a state that the ejection surface and the electrode are apart from each other by a second distance greater than the first distance and until the liquid droplet lands on the electrode.

According to the present disclosure, it is possible to obtain the flying speed of the liquid droplet and to obtain the ejection bending amount with respect to the normal flying direction of the liquid droplet. Accordingly, it is possible to detect the occurrence of the ejection failure based on the flying speed and the ejection bending amount, with high precision. In this case, the flying speed is calculated in a case that the distance between the ejection surface and the electrode is the first distance, and the ejection bending amount is calculated in a case that the distance between the ejection surface and the electrode is the second distance which is greater than the first distance. With this, an ejection bending amount which is detectable becomes greater than in a case of calculating the ejection bending amount in a case that the distance between the ejection surface and the electrode is the first distance. Thus, it is possible to make a detection time (detection period of time) (namely, a time after the liquid droplet is ejected and until the liquid droplet lands on the electrode), which is attributable to a magnitude of the ejection bending amount, to be long. With this, it is possible to obtain an ejection bending amount of which precision is high, while suppressing any influence of a noise.

According to the present disclosure, it is possible to provide a liquid droplet ejecting apparatus capable of detecting the ejection failure highly precisely than in the conventional technique.

In the following, a liquid droplet ejecting apparatus according to an embodiment of the present disclosure will be explained, with reference to the drawings. The liquid droplet ejecting apparatus to be explained below is merely an embodiment of the present disclosure. Accordingly, the present disclosure is not limited to or restricted by the following embodiment, and any addition, deletion and/or change is/are possible within a range not departing from the spirit of the present disclosure.

Figure 1:
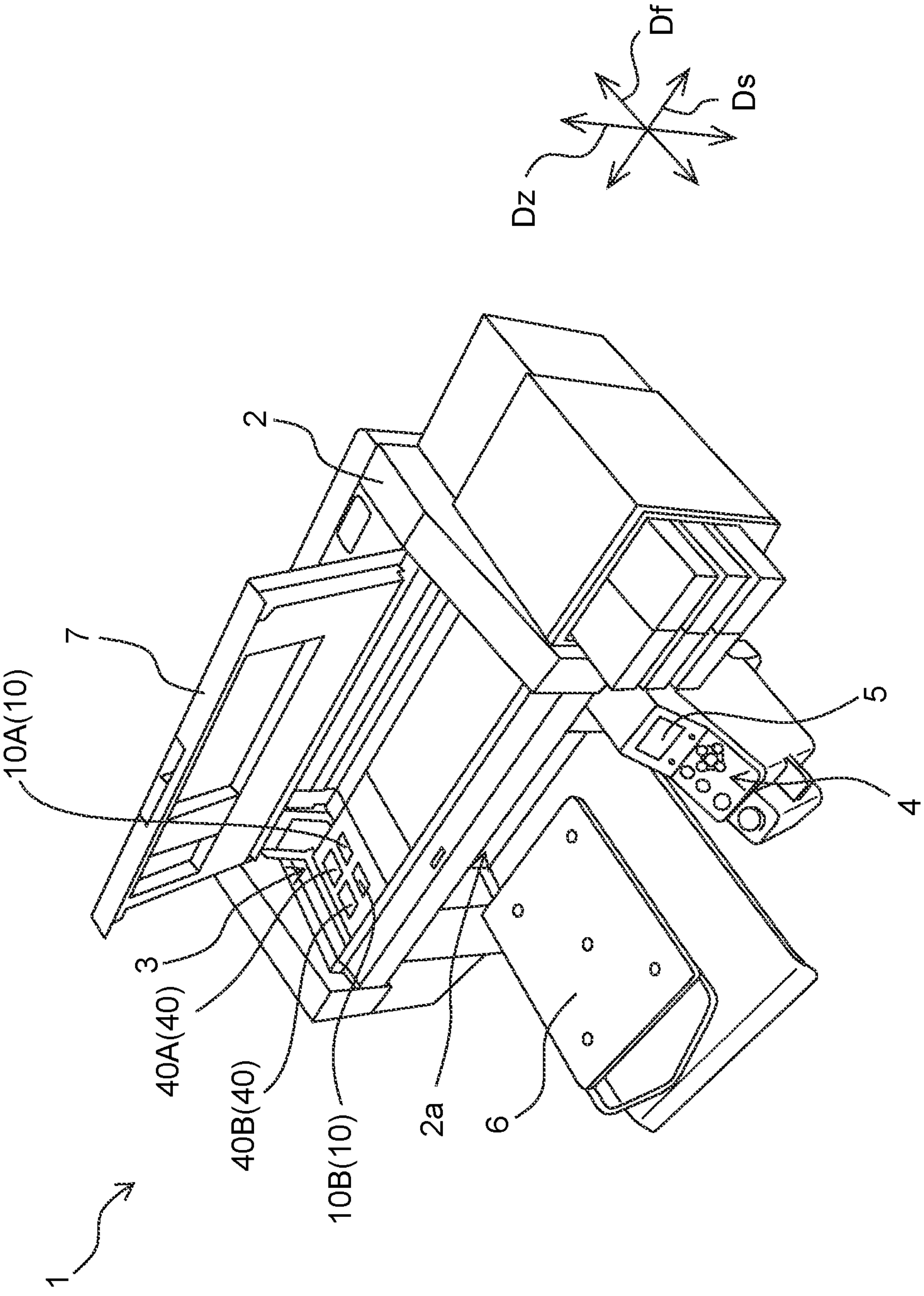
FIG. 1 is a perspective view depicting an image forming apparatus on which a liquid droplet ejecting apparatus according to an embodiment of the present disclosure is provided.

FIG. 1 is a perspective view depicting an image forming apparatus 1 on which a liquid droplet ejecting apparatus **1*a* according to the embodiment of the present disclosure is provided. In the following, although an ink-jet printer capable of performing also a printing with respect to a print medium W, which is a three-dimensional object, is disclosed, as an example of the image forming apparatus 1, the image forming apparatus 1 also includes an ink-jet printer capable of performing the printing only on a sheet (paper sheet, paper), etc. In FIG. 1, directions which are orthogonal to one another defined as a first direction Ds, a second direction Df and a third direction Dz. In the present embodiment, for example, the first direction Ds is a moving direction of a carriage 3** (to be described later on), the second direction Df is a conveying direction of a print medium W (to be described later on) and the third direction Dz is an up-down direction. In the following explanation, the first direction Ds is referred to as the moving direction Ds, the second direction Df is referred to as the conveying direction Df and the third direction Dz is referred to as the up-down direction Dz.

Figure 4:
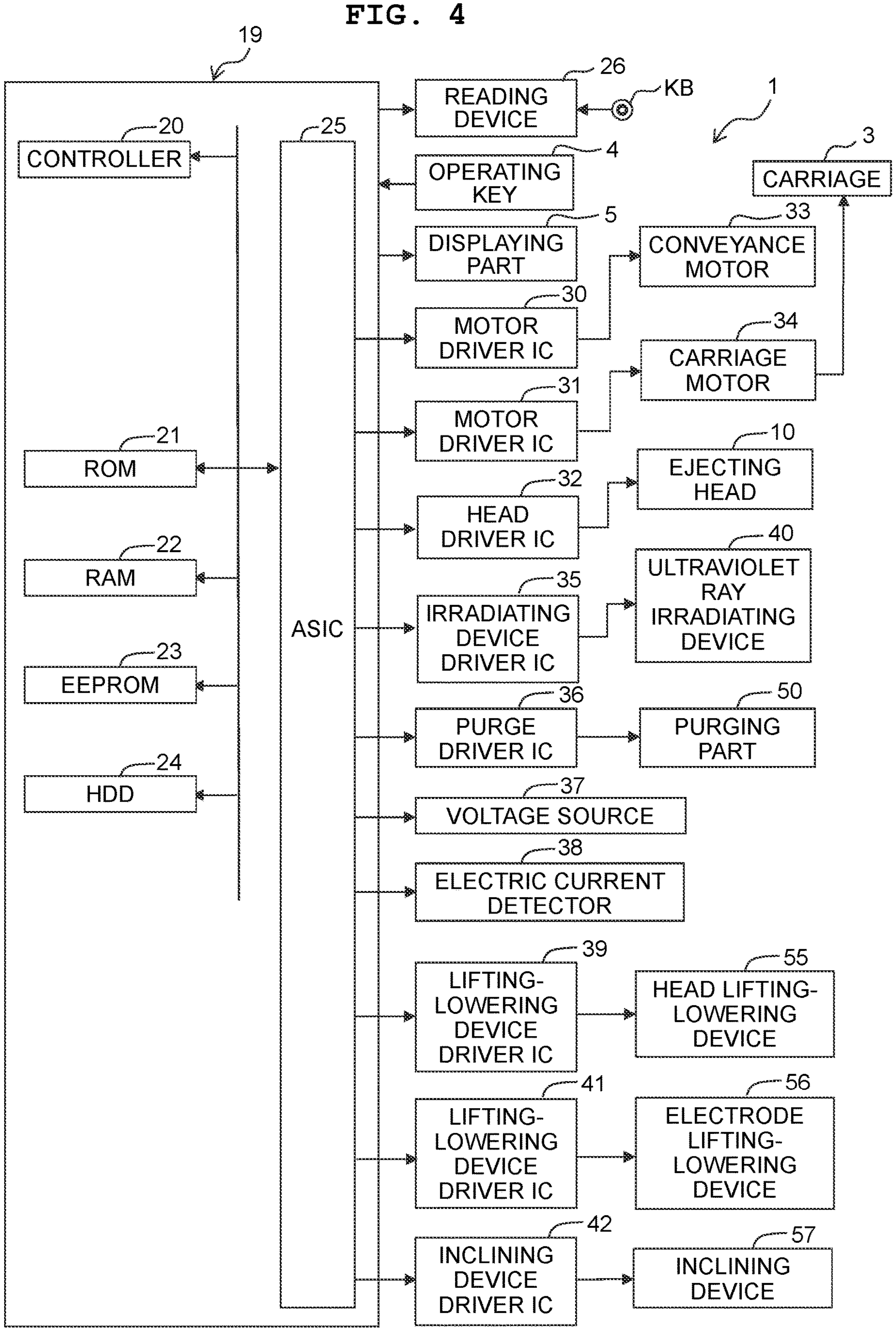
FIG. 4 is a block diagram depicting constitutional elements of the image forming apparatus of FIG. 1.

As depicted in FIG. 1, the image forming apparatus 1 of the present embodiment is provided with a casing 2, an operating key 4, a displaying part 5, a platen 6 on which the print medium W is arranged, and an upper cover 7. Further, the image forming apparatus 1 is provided with the liquid droplet ejecting apparatus 1*a* of FIG. 2. The liquid droplet ejecting apparatus 1*a* has: an ejecting head 10 which is, for example, a serial head; and a controller unit 19 which includes a controller 20 (FIG. 4). The ejecting head 10 is an ink-jet head which ejects, for example, a ultraviolet-curable ink droplet Id (FIG. 5) as a liquid droplet.

The casing 2 is formed to have a shape of a box. The casing 2 has an opening part 2*a*. The operating key 4 is provided on the casing 2. Further, the displaying part 5 is provided in the vicinity of the operating key 4. The operating key 4 receives an operational input by a user. The displaying part 5 is constructed, for example, of a touch panel, and displays specified information. A part of the displaying part 5 functions also as the operating key. The controller unit 19 realizes a printing function based on an input from the operating key 4 or an external input via a non-illustrated communication interface. Further, the controller unit 19 controls display of the displaying part 5.

The platen 6 is configured to place the print medium W thereon. The platen 6 has a predetermined thickness, and is constructed, for example, of a rectangular plate member of which longitudinal direction is the conveying direction Df. The platen 6 is detachably supported by a non-illustrated platen supporting stand. The platen supporting stand is configured to be movable in the conveying direction Df, by driving of a conveying motor 33 (FIG. 4), between a print position at which the printing with respect to the print medium W is executed and an attaching-detaching position at which the print medium W is attached to or detached from the platen 6. With this, the platen 6 relatively moves an ejection-objective surface of the print medium W relative to the ejecting head 10 in the conveying direction Df. Since the platen 6 moves in the conveying direction Df during the printing, the print medium W placed on the platen 6 is conveyed along the conveying direction 6.

The upper cover 7 is configured such that in a case that an end part of the upper cover 7 is lifted upward, the upper cover 7 is rotated upward. With this, the inside of the casing 2 is exposed.

Figure 2:
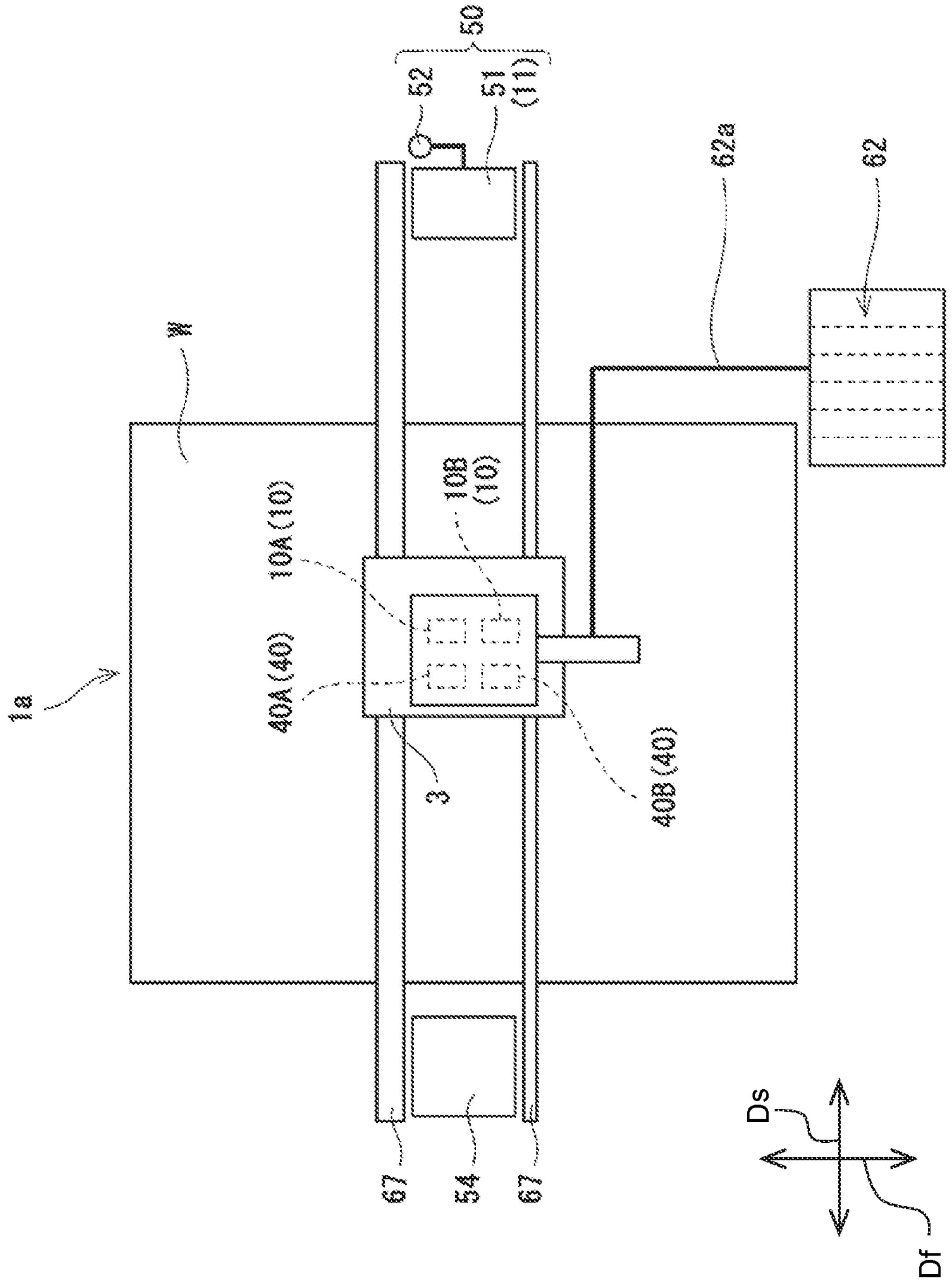
FIG. 2 is a plan view depicting the liquid droplet ejecting apparatus according to the embodiment of the present disclosure.

As depicted in FIG. 2, the liquid droplet ejecting apparatus 1*a* is provided with: a storing tank 62, the carriage 4, and a pair of guide rails 67. The carriage 3 has, for example, two metallic ejecting heads 10 (10A, 10B) and two ultraviolet ray irradiating devices 40 (40A, 40B) mounted thereon. Note that although the two ejecting heads 10 and the two ultraviolet ray irradiating devices 40 are provided on the liquid droplet ejecting apparatus 1*a*, the configuration of the liquid droplet ejecting apparatus 1*a* is not limited to this; it is also allowable to provide one ejecting head 10 and one ultraviolet irradiating device 40 on the liquid droplet ejecting apparatus 1*a*.

The carriage 3 is supported by the pair guide rails 67 extending in the moving direction Ds, and moves reciprocally in the moving direction Ds along the pair of guide rails 67. With this, the two ejecting heads 10 (10A, 10B) and the two ultraviolet ray irradiating devices 40 (40A, 40B) move reciprocally in the moving direction Ds. Further, the ejecting heads 10 are connected to the storing tank 62 via a tube 62*a*.

In the present embodiment, the ejecting head 10A ejects, for example, ink droplets Id of respective colors which are yellow (Y), magenta (M), cyan (C) and black (K) which are collectively referred to as a color ink, in some cases. The ink droplets Id of the above-described four colors are ejected on the print medium W to thereby print a color image on the print medium W. On the other hand, the ejecting head 10B ejects ink droplets Id of white (W) and ink droplets Id of a clear (Cr). In a case of printing a color image, for example, on a fabric (textile) as the print medium W, the ink droplets Id of the white ink is previously ejected on the print medium W so as to lower any influence to the color of the fabric and/or the material of the fabric, and the ink droplets Id of the color inks are ejected on the ink droplets Id of the white ink. Further, the ink droplets Id of the clear ink are ejected in a case of imparting glossiness and/or in a case of protecting a print part (on which the printing is performed).

The inks are stored in the storing tank 62. The storing tank 62 is provided for each of kinds of the ink. The storing tank 62 is provided, for example, as six storing tanks 62, and store, respectively, the black, yellow, cyan, magenta, white and clear inks.

The liquid ejecting apparatus 1*a* is further provided with a purging part 50 and a receiving part 54. The receiving part 54 is arranged at an end part on one side in the moving direction Ds of the pair of guide rails 67 so that the receiving part 54 overlaps with a moving area of the carriage 3. The purging part 50 is arranged at an end part on the other side in the moving direction Ds of the pair of guide rails 67 so that the purging part 50 overlaps with the moving area of the carriage 3.

The purging part 50 has a cap 51, a suction pump 52 and a non-illustrated lifting-lowering mechanism. The lifting-lowering mechanism lifts and lowers the cap 51 between a suction position and a standby position. The suction pump 52 is connected to the cap 51. At the standby position, an ejection surface NM (FIG. 3) is away from the cap 51. On the other hand, at the suction position, the ejection surface NM is covered by the cap 51 and an enclosed space is defined. In a case that the cap 51 is at the suction position and that the suction pump 52 is driven, the pressure of the enclosed space becomes to be a negative pressure to thereby discharge (exhaust) the ink from a nozzle holes 121*a* (FIG. 3) (a purging processing).

In a case that the printing on the print medium W is not performed, the ejection surface NM of the ejecting head 10 is covered by the cap 51. An electrode 11 (to be described in detail later on) is formed in the cap 51. In a case that the ejection surface NM is covered by the cap 51, the cap 51 is rotated by a driving device 58 (to be described later on) so that the cap 51 is parallel to the ejecting surface NM.

The receiving part 54 receives the ink droplet Id discharged from the ejecting head 10 by a flushing processing.

Figure 3:
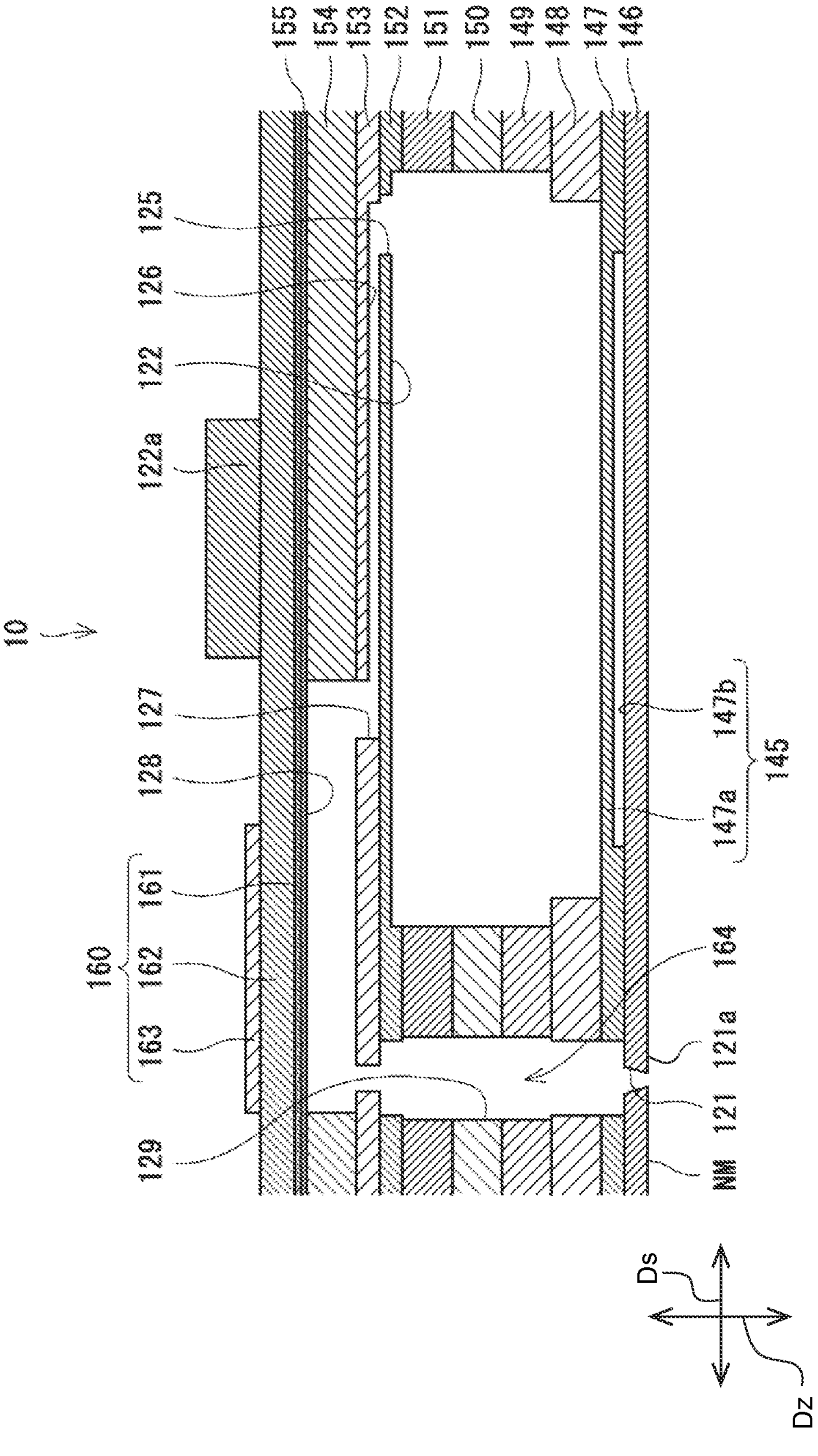
FIG. 3 is a cross-sectional view depicting the configuration of an ejecting head of FIG. 1.

Next, the detailed configuration of the ejecting head 10 will be explained. As depicted in FIG. 3, the ejecting head 10 has a plurality of nozzles 121. The ink supplied from the storing tank 62 to the ejecting head 10 is discharged from the plurality of nozzles 121 as the ink droplets Id. The ejecting head 10 has a stacked body of a channel forming body and a volume changing part. An ink channel is formed in the inside of the channel forming body. A plurality of nozzle holes 121*a* is opened in the ejection surface Nm which is a lower surface of the channel forming body. Further, the volume changing part changes the volume of the ink channel. In this situation, in each of the plurality of nozzles holes 121*a*, the meniscus is vibrated so as to eject the ink from each of the plurality of nozzles holes 121*a*.

The channel forming body of the ejecting head 10 is a stacked body of a plurality of plates. The volume changing part includes a vibration plate 155 and an actuator (piezoelectric element) 160. A common electrode 161 (to be described later on) is formed on the vibration plate 155.

The channel forming body is formed by stacking, from the lower side in the following order: a nozzle plate 146, a spacer plate 147, a first channel plate 151, a second channel plate 149, a third channel plate 150, a fourth channel plate 151, a fifth channel plate 152, a sixth channel plate 153 and a seventh channel plate 154.

Holes and grooves of which size are various are formed in the respective plates. In the inside of the channel forming body in which the respective plates are stacked, the holes and grooves are combined to thereby form the plurality of nozzles 121, a plurality of individual channels 164 and a manifold 122, as the ink channel.

Each of the plurality of nozzles 121 is formed to penetrate through the nozzle plate 146 in a stacking direction. The plurality of nozzles holes 121*a* is arranged side by side in the ejection surface NM of the nozzle plate 146 in the conveying direction Df so as to form a nozzle array.

The manifold 122 extends in the conveying direction Df, and is connected to an end of each of the plurality of individual channels 164. Namely, the manifold 122 functions as a common channel of the ink. A through hole which penetrates through the first channel plates 148 to the fourth channel plate 151 in the stacking direction and a recessed part which is recessed from a lower surface of the fifth channel plate 152 are overlapped or stacked in the stacking direction to thereby form the manifold 122.

The nozzle plate 146 is arranged at a location below the spacer plate 147. The spacer plate 47 is formed, for example, of a stainless steel material. In the spacer plate 147, a recessed part 145 recessed from a surface, of the spacer plate 147 on a side of the nozzle plate 146, in a thickness direction of the spacer plate 147 is formed by, for example, the half etching. The recessed part 145 has a thinned part constructing a damper part 147*a* and a damper space 147*b*. With this, the damper space 147*b* as a buffer space is defined between the manifold 122 and the nozzle plate 146.

A supply port 122*a* is communicated with the manifold 122. The supply port 122*a* is formed, for example, in a cylindrical shape, and is provided on an end in the conveying direction Df of the manifold 122. Note that the manifold 122 and the supply port 122*a* are connected to each other by a non-illustrated channel.

Each of the plurality of individual channels 164 is connected to the manifold 122. Each of the individual channels 164 has an upstream end connected to the manifold 122 and a downstream end connected to a base end of one of the plurality of nozzles 121. Each of the individual channels 164 is constructed of a first communicating hole 125, a supply throttle channel 126 as an individual throttle channel, a second communicating hole 127, a pressure chamber 128, and a descender 129; and these constitutive elements are connected in this order.

A lower end of the first communicating hole 125 is connected to an upper end of the manifold 122. The first communicating hole 125 extends from the manifold 122 upward in the stacking direction, and penetrates a upper part in the fifth channel plate 152 in the stacking direction.

An upstream end of the supply throttle channel 126 is connected to an upper end of the first communicating hole 125. The supply throttle channel 126 is formed, for example, by the half etching, and is constructed of a groove recessed from a lower surface of the sixth channel plate 153. Further, an upstream end of the second communicating hole 127 is connected to a downstream end of the supply throttle 126. The second communicating hole 127 extends from the supply throttle channel 126 upward in the stacking direction, and is formed to penetrate the sixth channel plate 153 in the stacking direction.

An upstream end of the pressure chamber 128 is connected to a downstream end of the second communicating channel 127. The pressure chamber 128 is formed to penetrate the seventh channel plate 154 in the stacking direction.

The descender 129 is formed to penetrate, in the stacking direction, the spacer plate 147, the first channel plate 148, the second channel plate 149, the third channel plate 150, the fourth channel plate 151, the fifth channel plate 152 and the sixth channel plate 153. An upstream end of the descender 129 is connected to a downstream end of the pressure chamber 128 and a downstream end of the descender 129 is connected to the base end of each of the nozzles 121. For example, each of the nozzles 121 overlaps with the descender 129 in the stacking direction, and is arranged at the center in the descender 129 in a width direction.

The vibration plate 155 is stacked on the seventh channel plate 154 and covers an upper end opening of the pressure chamber 128.

The actuator 160 includes the common electrode 161, a piezoelectric layer 162 and an individual electrode 163 which are arranged from the lower side in this order. The common electrode 161 covers the entire surface of the vibration plate 155. The piezoelectric layer 162 covers the entire surface of the common electrode 161. The individual channel 163 is provided on the pressure chamber 128, and is arranged on the piezoelectric layer 162. One piece of the actuator 160 is constructed of one piece of the individual electrode 163, the common electrode 131 and a part (active part), of the piezoelectric layer 162, which are sandwiched by one piece of the individual electrode 163 and the common electrode 161.

The individual electrode 163 is electrically connected to a driver IC. The driver IC receives a control signal from the controller 20, generates a driving signal (voltage signal) and applies the driving signal to the individual electrode 163. In contrast, the common electrode 161 is always maintained at a ground potential. In such a configuration, the active part of the piezoelectric layer 162 expands and contracts in accordance with the driving signal, together with the common electrode 161 and the individual electrode 163, in a plane direction. In response to this, the vibration plate 155 deforms in a direction increasing or decreasing the volume of the pressure chamber 128. With this, an ejecting pressure of ejecting the ink droplet Id from each of the nozzles 121 is imparted to the ink inside the pressure chamber 128.

In the ejecting head 10, the ink flows into the manifold 122 via the supply port 122*a*, and then flows into the supply throttle channel 126 from the manifold 122 via the first communicating hole 125. Further, the ink flows into the pressure chamber 128 from the supply throttle channel 126 via the second communicating hole 127. Afterwards, the ink flows in the descender 129 and flows into each of the nozzles 121. In this situation, in a case that the ejecting pressure is applied from the actuator 160 to the pressure chamber 128, the ink droplet Id is ejected from one of the nozzle holes 121*a*.

As depicted in FIG. 4, the image forming apparatus 1 is further provided with a controller unit 19, a reading device 26, a motor driver ICs 30, 31, a head driver IC 32, a conveying motor 33, a carriage motor 34, an irradiating device driver IC 35, a purge driver IC 36, a lifting-lowering device driver ICs 39, 41 and an inclining device driver IC 42. The liquid droplet ejecting apparatus 1*a* is further provided with a voltage source 37, an electric current detector 38, a head lifting-lowering device 55, an electrode lifting-lowering device 56 and an inclining device 57.

The controller unit 19 has the controller 20 constructed of a CPU, memories (storing parts: a ROM 21, a RAM 22, an EEPROM 23 (EEPROM is a registered trademark of Renesas Electronics Corporation) and a HDD 24) and an ASIC 25. The controller 20 is connected to each of the above-described storing parts, and controls the driver ICs 30 to 32, 35, 36, 39, 41 and 42 and the displaying part 5.

The controller 20 executes a predetermined processing program stored in the ROM 21 to thereby executes a variety of kinds of functions. The controller 20 may be mounted on the controller unit 19 as one processor, or may be mounted on the controller unit 19 as a plurality of processors which cooperate each other. The processing program is read by the reading device 26 from a recording medium KB such as a computer-readable magneto-optical disc, etc., or a USB flash memory. etc., and the like, and is stored in the ROM 21. The RAM 22 stores image data received from outside and an arithmetic result of the controller 20, etc. The EEPROM 23 stores a variety of kinds of initial setting information inputted by the user. The HDD 24 stores specific information, etc.

The motor driver ICs 30 and 31, the head driver IC 32, the irradiating device driver IC 35, the purge driver IC 36, the voltage source 37, the electric current detector 38, the lifting-lowering device driver ICs 39 and 41 and the inclining device driver IC 42 are connected to the ASIC 25. The ASIC 25 drivers the respective driver ICs, the voltage source 37 and the electric current detector 38, based on an instruction from the controller 20.

The controller 20 drives the conveying motor 33 by the motor driver IC 30 to thereby move the platen 6 in the conveying direction Df. The controller 20 drives the carriage motor 34 by the motor driver IC 31 to thereby move the carriage 3 in the moving direction Ds.

The controller 20 converts the image data obtained from an external apparatus, etc., into ejection data for ejecting the ink droplet Id onto the ejection surface of the print medium W. The controller 20 causes the ejecting head 10 to eject the ink droplet Id by the head driver IC 32 based on the converted ejection data. Further, the controller 20 causes light-emitting diode chips of the ultraviolet ray irradiating device 40 to radiate an ultraviolet ray by the irradiating device driver IC 35. The controller 20 drives the purging part 50 by the purge driver IC 36.

The controller 20 drives the head lifting-lowering device 55 via the lifting-lowering device driver IC 39 so as to lift or lower the ejecting head 10. The controller 20 drives the electrode lifting-lowering device 56 via the lifting-lowering device driver IC 41 so as to lift or lower the electrode 11 (to be described later on). Further, the controller 20 inclines the inclining device 57 (to be described later on) via the inclining device driver IC 42.

The controller 20 causes, by the voltage source 37, a potential difference to be generated between the ejecting head 10 and the electrode 11. In a case that the potential difference is generated between the ejecting head 10 and the electrode 11, the controller 20 causes the electric current detector 38 to detect an electric current flowing between the ejecting head 10 and the electrode 11.

The controller 20 causes the ink droplet Id to be ejected from the ejecting head 10 in a state that the potential difference is generated, by the voltage source 37, between the ejecting head 10 and the electrode 11 which are apart from each other by a predetermined distance. The controller 20 calculates a flying speed of the ink droplet Id based on a time during which the electric current flows between the ejecting head 10 and the electrode 11 in the above-described situation and based on the predetermined distance. Further, the controller 20 calculates an ejection bending amount with respect to a normal flying direction of the ink droplet Id ejected by the ejecting head 10. Note that the calculation of the flying speed of the ink droplet Id and the calculation of the ejection bending amount by the controller 20 will be described in detail later on.

Figure 5:
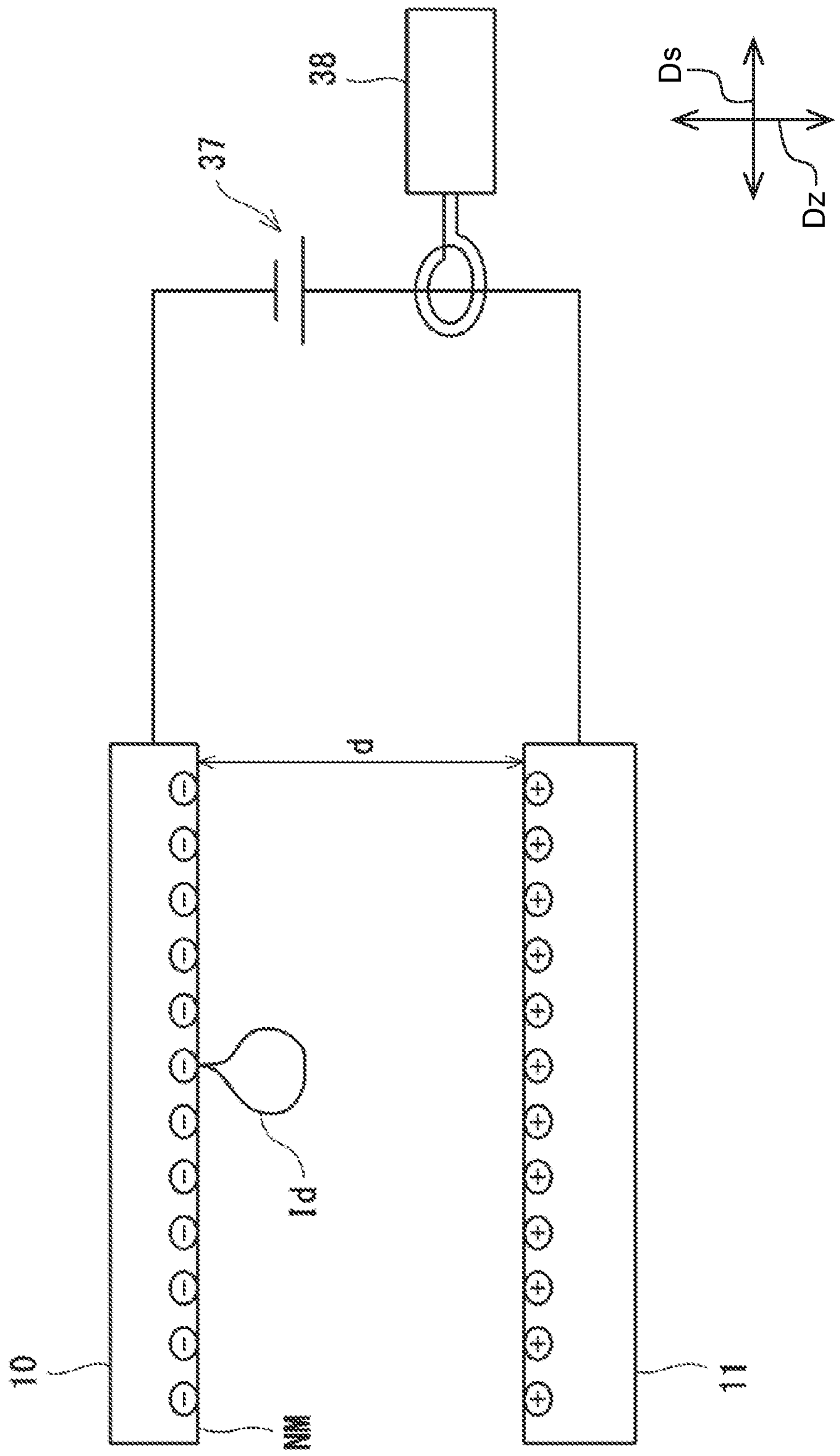
FIG. 5 is a view depicting an aspect wherein an ink droplet is ejected by the ejecting head in a state that a potential difference is generated between the ejecting head and an electrode, and the configuration of detecting an electric current which flows in a case that the ink droplet is ejected.

As depicted in FIG. 5, in a case that an ink droplet Id is ejected from the ejecting head 10 in the state that the potential difference is generated between the ejecting head 10 and an electrode 11, an electric charge corresponding to an electric charge amount possessed by the ink droplet Id is induced in each of the ejecting head 10 and the electrode 11. Accordingly, an electric current corresponding to a difference between the electric charge amount induced in the ejecting head 10 and the electric charge amount induced in the electrode 11 flows between the ejecting head 10 and the electrode 11. In this situation, the electric current detector 38 detects the electric current flowing between the ejecting head 10 and the electrode 11.

Figure 6:
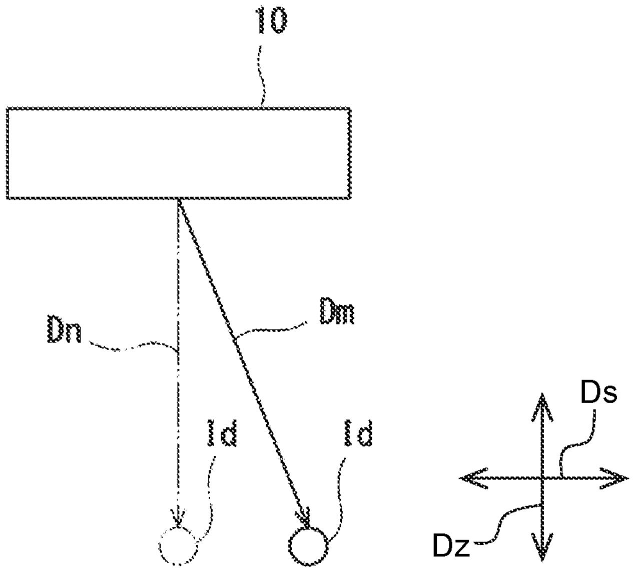
FIG. 6 is a view for explaining an ejection bending of the ink droplet.

Here, the ejection bending of the ink droplet Id ejected from the ejecting head 10 will be explained. As depicted in FIG. 6, an ink droplet Id ejected from a normal nozzle 121 of the ejecting head 10 flies along a normal flying direction Dn. In contrast, an ink droplet Id ejected from a nozzle 121, of the ejecting head 10, in which an ejection failure occurs flies along a bent flying direction Dm which is inclined with respect to the normal flying direction Dn.

Figure 7:
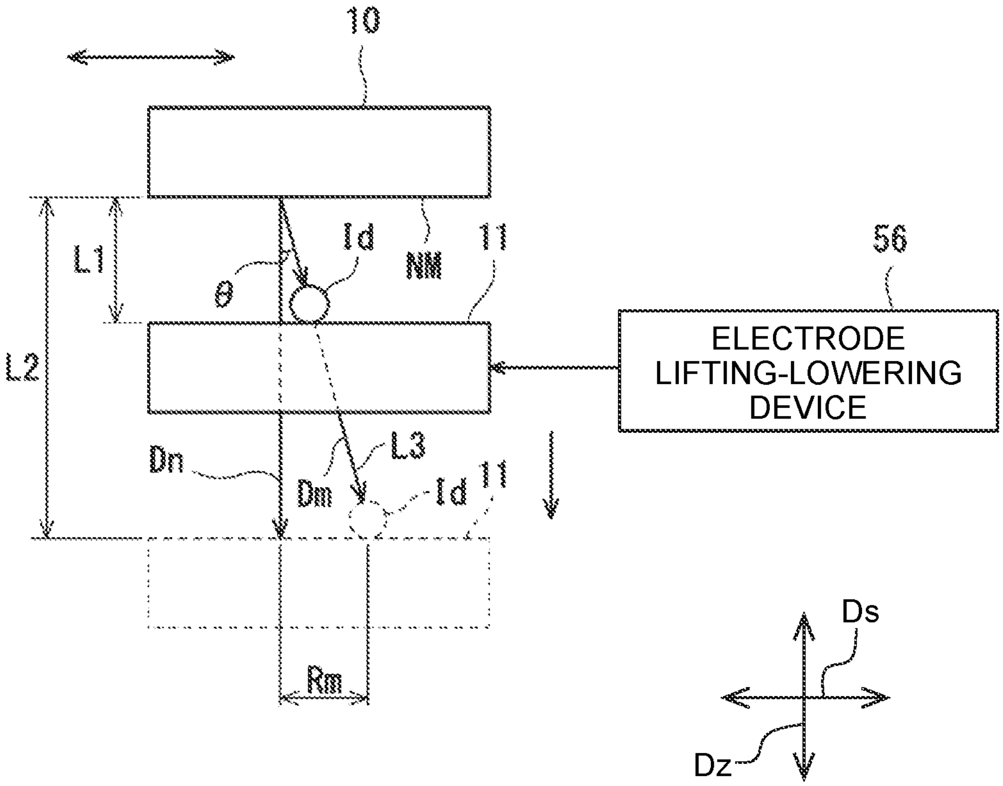
FIG. 7 is a view for explaining a method of calculating a flying speed and an ejection bending amount of the ink droplet ejected by the ejecting head.

As depicted in FIG. 7, in a case that the controller 20 calculates the flying speed of the ink droplet Id, the controller 20 first moves the electrode 11 by the electrode lifting-lowering device 56 so that a distance between the ejection surface NM of the ejecting head 10 and the electrode 11 becomes to be a first distance L1. Note that the details of the configuration of the electrode lifting-lowering device 56 will be described later on.

Next, the controller 20 causes the voltage source 37 to generate the potential difference between the ejecting head 10 and the electrode 11. Then, the controller 20 causes the ejecting head 10 to eject the ink droplet Id therefrom. With this, an electric current corresponding to the difference between the electric charge amount induced in the ejecting head 10 and the electric charge amount induced in the electrode 11 flows between the ejecting head 10 and the electrode 11. In this situation, the electric current flowing between the ejecting head 10 and the electrode 11 is detected by the electric current detector 38.

The controller 20 measures a time during which the electric current detected by the electric current detector 38 flows. In a case that the flying speed of the ink droplet Id is "v", the distance between the ejecting head 10 and the electrode 11 is "d" (d=L1) and the time (period of time)

during which the electric current flows is "T", the controller 20 calculates the fling speed of the ink droplet Id by a calculation formula: v=d/T.

Here, the controller 20 is capable of changing a volume of the ink droplet Id ejected from the nozzle 121. The controller 20 is capable of causing the ejecting head 10 to eject an ink droplet of which liquid droplet size is medium-sized or large-sized. In a case that the controller 20 calculates the flying speed of the ink droplet Id, the controller 20 causes the ejecting head 10 to eject an ink droplet Id of which volume is relatively large. Specifically, in a case that the controller 20 calculates the flying speed of the ink droplet Id, the controller 20 causes the ejecting head 10 to eject an ink droplet Id of which volume is greater than a volume of the ink droplet Id during a normal printing.

After the controller 20 has calculated the flying speed of the ink droplet Id, the controller 20 determines as to whether or not a difference between the calculated fling speed and a normal speed of the ink droplet Id which is previously stored in the ROM 21, etc., is not less than a threshold value. In a case that the difference between the calculated fling speed and the normal speed is not less than the threshold value, the controller 20 calculates the ejection bending amount of the ink droplet Id as described in the following. Note that, in a case that the difference between the calculated flying speed and the normal speed is less than the threshold value, the controller 20 considers that the ejection failure does not occur, and it is allowable that the controller 20 does not calculate the ejection bending amount. Note that the normal speed of the ink droplet Id is, for example, 5 m/s, and that the above-described threshold value is, for example, 3 m/s.

The controller 20 moves the electrode 11 by the electrode lifting-lowering device 56 so that the distance between the ejection surface Nm of the ejecting head 10 and the electrode 11 becomes to be a second distance L2 greater than the first distance L1. Next, the controller 20 causes the voltage source 37 to generate the potential difference between the ejecting head 10 and the electrode 11.

Next, the controller 20 causes the ejecting head 10 to eject the ink droplet Id. It is assumed that the ejected ink droplet Id flies along the bent flying direction Dm which is inclined with respect to the normal flying direction Dn.

In a case that the ink droplet Id is ejected, the electric current flows between the ejecting head 10 and the electrode 11. In this situation, the electric current flowing between the ejecting head 10 and the electrode 11 is detected by the electric current detector 38. The controller 20 measures the time during which the electric current detected by the electric current detector 38 flows. This time can be considered as a time required for an ink droplet, regarding which the ejection bending occurs, to fly a flying distance L3 since the ink droplet Id has been ejected by the ejecting head 10 and until the ink droplet Id lands on the electrode 11.

The controller 20 uses the flying speed of the ink droplet Id which has been calculated previously and the measured time during which the electric current flows to thereby calculate the distance d (namely, the flying distance L3 of the ink droplet Id of FIG. 7), with the above-described calculation formula: v=d/T.

With this, the distance L2 and the distance L3 are known. Accordingly, an angle θ defined by the normal flying direction Dn according to the distance L2 and the bent flying direction Dm according to the distance L3 can be calculated by a calculation formula: θ=arccos (L2/L3). Accordingly, the controller 20 obtains the angle θ as the ejection bending amount. Alternatively, it is also allowable that a distance Rm which is a difference between a position at which the ink droplet Id, flying in the normal flying direction Dn, lands and a position at which the ink droplet Id, flying in the bent flying direction Dm, lands to be the ejection bending amount. In this case, the controller 20 is capable of calculating the distance Rm by a calculation formula: Rm=L3×sin θ.

Figure 8:
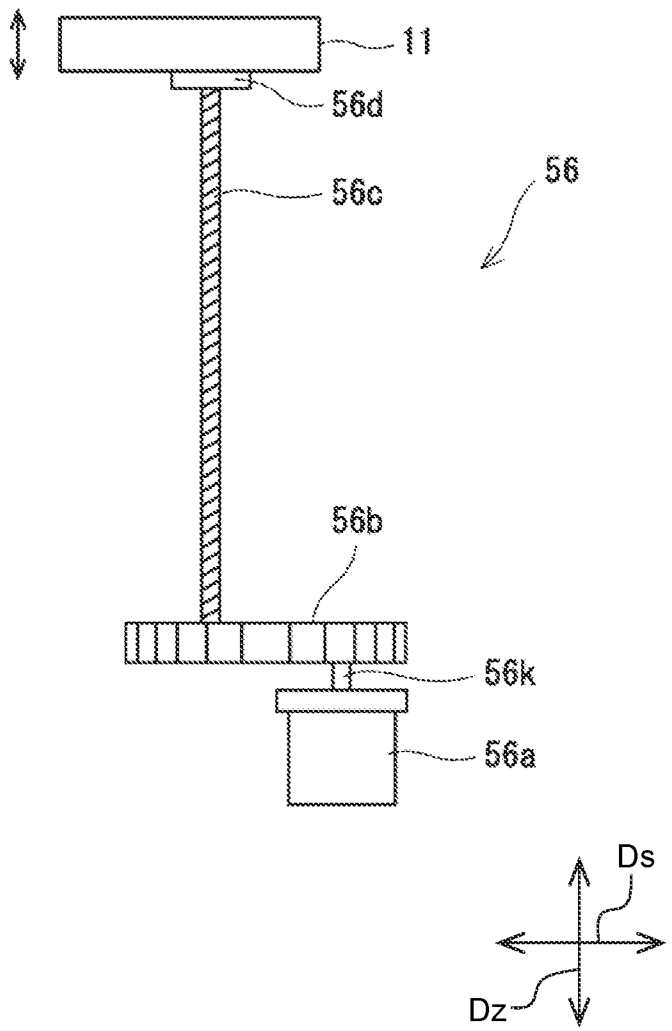
FIG. 8 is a view depicting an example of the configuration of an electrode lifting-lowering device which lifts and lowers the electrode.

The controller 20 causes the electrode lifting-lowering device 56 as depicted in FIG. 8 to lift or lower the electrode 11 to thereby change the distance between the electrode 11 and the ejection surface NM of the ejecting head 10. Note that since the configuration of the head lifting-lowering device 55 is same as the configuration of the electrode lifting-lowering device 56, the explanation for the head lifting-lowering device 55 will be omitted.

The following configuration is an example, and is not intended to limit or restrict the configuration of the electrode lifting-lowering device 56. As depicted in FIG. 8, the electrode lifting-lowering device 56 has a motor 56*a* which is, for example, an electric motor, a reduction gear 56*b* including a driving-side gear and a driven-side gear, a ball spring 56*c* and a movable table 56*d*. A rotation shaft 56*k* of the motor 56*a* is connected to the driving side gear of the reduction gear 56*b*. Further, the ball screw 56*c* is arranged so that the ball screw 56*c* extends in the up-down direction Dz. The movable table 56*d* is connected to the ball screw 56*c*. The electrode 11 is supported by the movable table 56*d*.

In a case that the motor 56*a* is rotationally driven by the controller 20, a rotatory force of the motor 56*a* is transmitted to the ball screw 56*c* via the reduction gear 56*b*. With this, the ball screw 56*c* rotates about the axis thereof, which in turn causes the movable table 56*d* moves, accompanying with this, in the up-down direction Dz. With this, it is possible to move the electrode 11 supported by the movable table 56*d* in the up-down direction Dz. With this, it is possible to change the distance between the electrode 11 and the ejection surface NM of the ejecting head 10.

After the distance between the ejection surface NM of the head 10 and the electrode 11 is made to be the first distance L1 and the flying speed of the ink droplet Id is calculated as described above, the ejecting head 10 may be inclined in a case that the above-described distance is made to be the second distance L2 so as to obtain the ejection bending amount of the ink droplet Id.

Figure 9:
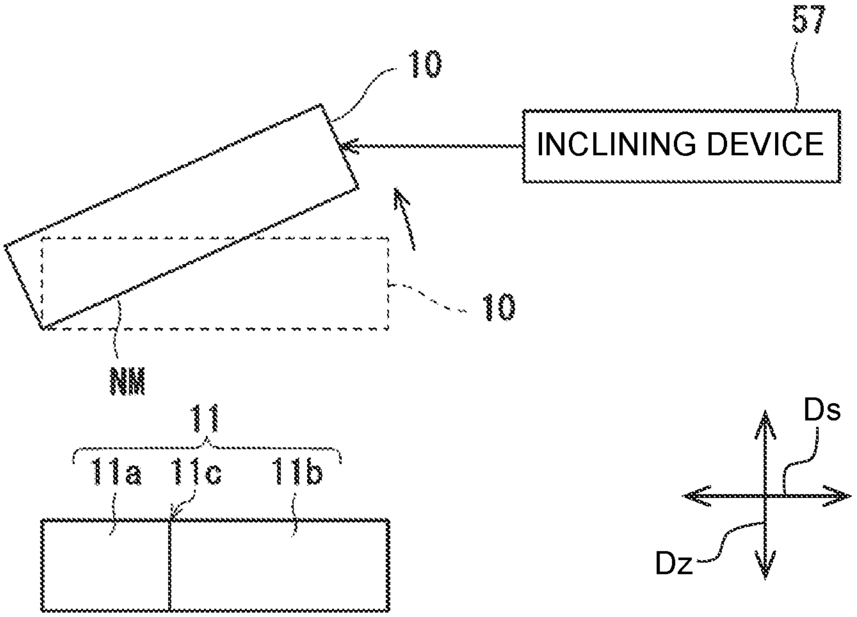
FIG. 9 is a view depicting the ejecting head inclined by an inclining device.

As depicted in FIG. 9, the electrode 11 is arranged horizontally. By an instruction of the controller 20, the inclining device 57 inclines the ejecting head 10 so that the ejection surface NM of the ejecting head 10 is inclined with respect to the electrode 11.

Figure 10:
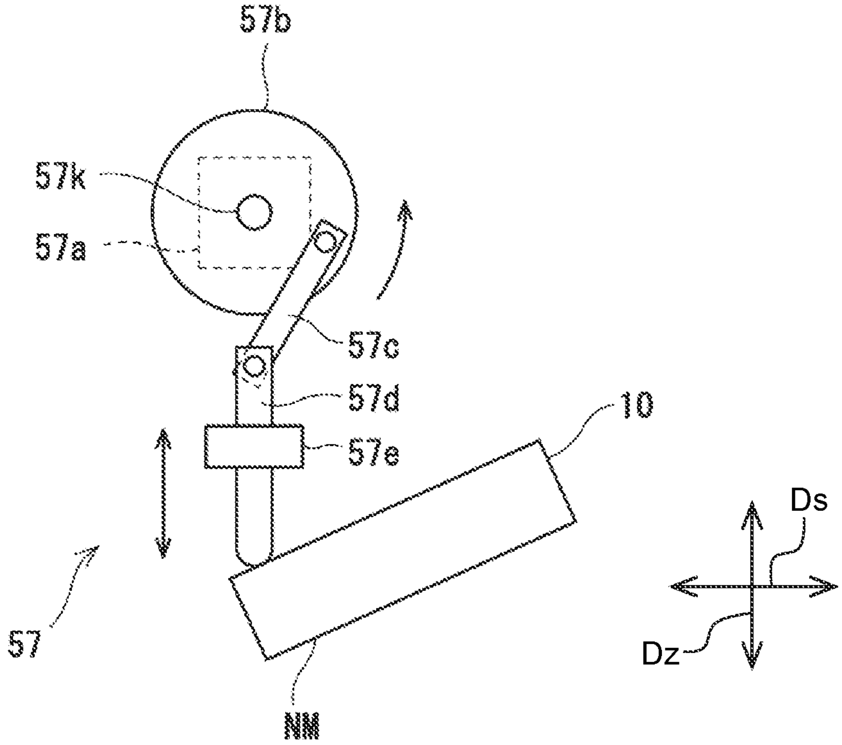
FIG. 10 is a view depicting an example of the configuration of the inclining device of FIG. 9.

The configuration of the inclining device 57 will be explained. The following configuration is an example, and is not intended to limit the configuration of the inclining device 57. As depicted in FIG. 10, the inclining device 57 has a motor 57*a* which is, for example, an electric motor, a rotation shaft 57*k* connected to the motor 57*a*, a disc-shape rotating plate 57*b*, a transmitting part 57*c*, a lifting-lowering part 57*d* which extends in the up-down direction Dz and which is reciprocally movable in the up-down direction Dz and a supporting part 57*e*. Note that a decelerating device is connected to the motor 57*a*.

The rotating shaft 57*k* is connected to the center of the rotating plate 57*b*. The transmitting part 57*c* is formed, for example, to have a stick-like shape. One end of the transmitting part 57*c* is eccentrically connected with respect to the rotating plate 57*b*. The other end of the transmitting part 57*c* is connected to an upper end of the lifting-lowering part 57*d*. The supporting part 57*e* supports the lifting-lowering part 57*d* to be movable in the up-down direction Dz. A lower end of the lifting-lowering part 57*d* is fixed to a part on one side of an upper surface of the ejecting head 10.

In a case that the motor 57*a* is rotationally driven by the controller 20, a rotatory force of the motor 57*a* is transmitted to the rotating plate 57*b* via the rotation shaft 57*k*. With this, the rotation plate 57*b* rotates about the rotation shaft 57*k*, which in turn causes the transmitting part 57*c* moves, accompanying with this, the lifting-lowering part 57*d* upward or downward. With this, since the ejecting head 10 is pulled or pushed by the lifting-lowering part 57*d*, a position of the part on the one side of the ejecting head 10 (namely, a pressed part by the lifting-lowering part 57*d*) becomes higher or lower than a position of a part on the other side of the ejecting head 10. With this, it is possible to incline the ejection surface NM of the ejecting head 10 with respect to the electrode 11. In such a manner, it is possible to change the distance between the ejection surface NM and the electrode 11 so as to make the distance between the ejection surface NM of the ejecting head 10 and the electrode 11 to be the second distance L2 in a case of obtaining the ejection bending amount of the ink droplet Id.

Here, in FIG. 9, the electrode 11 may include a conductive part 11*a* and a non-conductive part 11*b* which is adjacent to the conductive part 11*a*. Before performing the calculation of the flying speed of the ink droplet Id and the calculation of the ejection bending amount, the controller 20 detects a boundary point 11*c* between the conductive part 11*a* and the non-conductive part 11*b*, namely, as an origin of relative movement of the ejection surface NM of the ejecting head 10 relative to the electrode 11 in FIG. 9. This is based on an idea that it is desired to obtain the origin since any positional deviation of the ejecting head 10 with respect to the electrode 11 might occur in a case that any moving error of the ejecting head 10 occurs.

In a case that the controller 20 detects the boundary point 11*c*, the controller 20 causes the ejecting head 10 to eject the ink droplet Id in a state that the potential difference is caused, by the voltage source 37, between the ejecting head 10 and the electrode 11. In this situation, in a case that the ink droplet Id ejected from the ejecting head 10 flies between the ejecting head 10 and the non-conductive head 11*v* and lands on the non-conductive head 11*b*, the electric current is not detected by the electric current detector 38. On the other hand, the controller 20 causes the inclining device 57 to move the ejecting head 10 and causes the ejecting head 10 to eject the ink droplet Id therefrom. In this situation, the controller 20 completes the detection of the boundary point 11*c* of the electrode 11 as the origin, at a timing at which the electric current detector 38 detects an electric current not less than a threshold value, due to the landing, on the boundary point 11*c*, of the liquid droplet Id which has flew at a location above the boundary point 11*c*. Note that in a case of moving the ejecting head 10 from the side of the conductive part 11*a* to the side of the non-conductive part 11*b*, the controller 20 completes the detection of the boundary point 11*c* at a timing at which an electric current not more than a predetermined threshold value is detected by the electric current detector 38.

Figure 11:
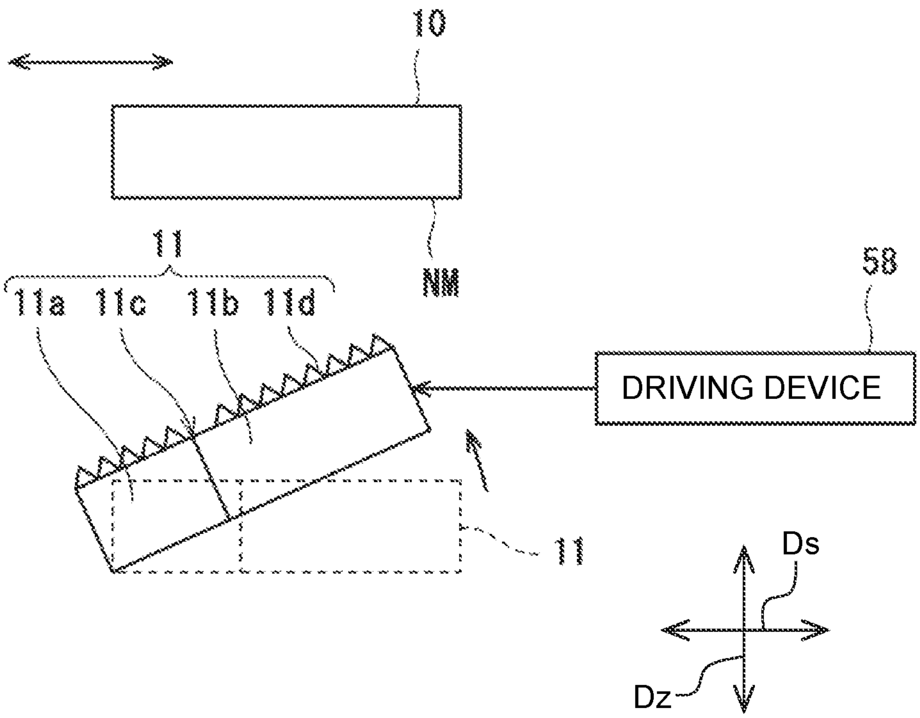
FIG. 11 is a view depicting the electrode inclined by a driving device.

In FIG. 9, although the ejecting head 10 is inclined to thereby change the distance between the electrode 11 and the ejection surface NM of the ejecting head 10, it is allowable to change the above-described distance by inclining the electrode 11 by the driving device 58, as depicted in FIG. 11. The configuration of the driving device 58 of FIG. 11 is same as the configuration of the inclining device 57.

After the flying speed of the ink droplet Id is calculated by making the distance between the ejection surface NM of the ejecting head 10 and the electrode 11 to be the first distance as described above, it is allowable to incline the electrode 11 in a case of making the above-described distance to be the second distance L2 so as to obtain the ejection bending amount of the ink droplet Id. In FIG. 11, the ejecting head 10 is arranged horizontally. In accordance with the instruction of the controller 20, the driving device 58 inclines the electrode 11 so that an upper surface of the electrode 11 is inclined with respect to the ejection surface NM of the ejecting head 10. With this, the upper surface of the electrode 11 on the side of (facing) the ejection surface NM is inclined with respect to the ejection surface NM.

In a case that the aspect of inclining the electrode 11 is adopted, an uneven part (convex-concave part) 11*d* is formed on a surface of the electrode 11 on the side of the ejection surface NM. This is from the viewpoint of preventing any liquid dripping of the ink droplet Id.

As explained above, according to the liquid ejecting apparatus 1*a*, it is possible to obtain the flying speed of the ink droplet Id and to obtain the ejection bending amount of the ink droplet Id with respect to the normal fling direction Dn. With this, it is possible to detect the occurrence of ejection failure, highly precisely, based on the flying speed and the ejection bending amount. In this case, the flying speed is calculated in the case that the distance between the ejection surface NM of the ejecting head 10 and the electrode 11 is the first distance L1, and the ejection bending amount is calculated in the case that the distance between the ejection surface NM and the electrode 11 is the second distance L2 which is greater than the first distance L1. Regarding this point, in a case that the distance between the ejection surface NM and the electrode 11 is relatively short, the influence of air resistance is small, and thus the flying speed can be easily detected with a high precision. On the other hand, in a case that the distance between the ejection surface NM and the electrode 11 is relatively long, an extent of the ejection bending appears more prominently or strongly by receiving the air resistance, and thus it is suitable to detect the ejection bending amount. With this, it is possible to obtain an ejection bending amount which is highly precise.

Further, in the present embodiment, in a case that the distance between the ejection surface NM of the ejecting head 10 and the electrode 11 is changed, it is possible to lift or lower the ejecting head 10 by the head lifting-lowering device 55. In this case, it is possible to easily change the distance between the ejection surface NM of the ejecting head 10 and the electrode 11. In particular, in a case that a serial head is used as the ejecting head 10, since the serial head is scanned in the moving direction (main scanning direction) Ds, the ejecting head 10 is a moving constituent element. Accordingly, by making the ejecting head 10 which is the moving constituent element to be further lifted or lowered and by making the electrode 11 as a fixed constituent element, it is possible to more easily obtain the positional accuracy of the ejecting head 10 with respect to the electrode 11.

Furthermore, in the present embodiment, in the case of changing the distance between the ejection surface NM of the ejecting head 10 and the electrode 11, it is possible to lift or lower the electrode 11 by the electrode lifting-lowering device 56. In this case, it is possible to easily change the distance between the ejection surface NM of the ejecting head 10 and the electrode 11. In particular, in a case that a line head is used as the ejecting head 10, since the line head is fixed, it is more suitable to lift or lower the electrode 11. Further, since the weight of the electrode 11 is smaller than that of the ejecting head 10, in a case that the electrode 11 which is light weight is moved, the braking of moving the electrode is more effective, thereby making it possible to reduce a time until the electrode 11 is stopped, and to obtain the positional accuracy of the electrode 11 with respect to the ejecting head 10 more easily. Furthermore, since a relatively small motor can be used, the size of the lifting-lowering device 56 can be made small. Moreover, in a case that the light-weight electrode 11 is moved, the time of moving the electrode 11 can be made short.

Further, in the present embodiment, the controller 20 calculates the ejection bending amount in a case that the difference between the calculated flying speed of the ink droplet Id and the normal speed is not less than the threshold value. In this case, in a situation that the occurrence of the ejection failure can be determined only based on the flying speed of the ink droplet Id, it is possible to avoid calculating the ejection bending amount unnecessarily. With this, it is possible to shorten the time required for determining the occurrence of the ejection failure, as compared with a case of calculating the ejection bending amount with respect to all of the nozzles 121.

Furthermore, in the present embodiment, it is also allowable that the controller 20 calculates the flying speed in a case that the result of the calculation of the ejection bending amount is that the calculated ejection bending amount is not less than a threshold value. In this case, in a situation that the occurrence of the ejection failure can be determined only based on the ejection bending amount of the ink droplet Id, it is possible to avoid calculating the flying speed unnecessarily. With this, it is possible to shorten the time required for determining the occurrence of the ejection failure, as compared with a case of calculating the flying speed with respect to all of the nozzles 121.

Moreover, in the present embodiment, by moving the ejecting head 10 in the moving direction Ds in a state that the upper surface of the electrode 11 is inclined, by the driving device 58, with respect to the ejection surface NM of the ejecting head 10, it is possible to easily change the distance between the ejection surface NM and the electrode 11.

Further, in the present embodiment, the electrode 11 includes the conductive part 11*a* and the non-conductive part 11*b* which is adjacent to the conductive part 11*a*. In this case, in a situation that the ink droplet Id ejected from the nozzle hole 121*a* of the ejection surface NM is present between the ejection surface NM and the non-conductive part 11*b* of the electrode 11, the potential difference is not generated between the ejecting head 10 and the electrode 11. By making the boundary point 11*c* between the non-conductive part 11*b* in which the potential difference is not generated as described above and the conductive part 11*a* to be the origin of the relative movement of the electrode 11 relative to the ejection surface NM, it is possible to avoid such a situation that the distance between the ejection surface NM and the electrode 11 is changed due to any relative positional deviation between the ejecting head 10 and the electrode 11. With this, the precision in the calculation of the distance between the ejection surface NM and the electrode 11 is improved.

Furthermore, in the present embodiment, by performing the calculation of the flying speed of the ink droplet Id and the calculation of the ejection bending amount of the ink droplet Id after the boundary point 11*c* as the origin has been detected, it is possible to eliminate the influence of the relative positional deviation between the ejecting head 10 and the electrode 11. With this, it is possible to obtain highly reliable results of the calculations.

Moreover, in the present embodiment, the convex-concave part 11*d* is formed on the surface of the electrode 11 on the side of the ejection surface NM. With this, it is possible to prevent any liquid dripping of the ink droplet Id landed on the inclined electrode 11.

Further, in the present embodiment, the electrode 11 is formed in the cap 51. Accordingly, it is not necessary to provide a new space for the electrode 11. This makes it possible to realize a small-sized liquid droplet ejecting apparatus 1*a*.

Furthermore, in the present embodiment, in a case that the controller 20 calculates the flying speed of the ink droplet Id, the controller 20 causes an ink droplet Id having a relatively large volume to be ejected. Since the air resistance is small with respect to an ink droplet Id of which volume is great as compared with an ink droplet Id of which volume is small, the flying speed is relatively maintained even at a position away from the ejecting head 10, thereby causing the difference between the flying speed of the ink droplet Id which has been normally ejected and the flying speed of the ink droplet Id regarding an ejection failure (unsatisfactory ejection) to occur more easily. Further, since a charge amount in the ink droplet Id becomes greater, as the volume of the ink droplet Id is greater, and the charge amount flowing between the ejection surface NM and the electrode 11 becomes great accompanying with the movement of the ink droplet Id, the ejection failure can be detected more easily.

Moreover, in a case that the aspect of inclining the ejecting head 10 by the inclining device 57 is adopted in the present embodiment, it is possible to arrange the electrode 11 horizontally. Accordingly, it is possible to prevent any liquid dripping of the ink droplet Id landed on the electrode 11 which is horizontally arranged.

Further, it is allowable that the controller 20 calculates the flying speed and the ejection bending amount in a case that the controller 20 causes the ink droplet Id to be ejected while causing the ejecting head 10 to reciprocally move in the moving direction Ds in a state that the electrode 11 is relatively inclined relative to the ejection surface NM by the inclining device 57 or the driving device 58. In this case, only by making the ejecting head 10 to reciprocally move in the moving direction Ds, it is possible to make the distance, between the ejection surface NM and the electrode 11 in the case of calculating the flying speed and the ejection bending amount with respect to one nozzle 121, to be the first distance L1 and the second distance L2 as described above. With this, it is possible to save a time for changing the distance between the ejection surface NM and the electrode 11 for each of the nozzles 121, thereby making it possible to make a time for the detection to be short.

Modifications

The present disclosure is not limited to or restricted by the above-described embodiment; the present disclosure can be appropriately changed or modified without changing the gist of the present disclosure.

In the above-described embodiment, although either one of the ejecting head 10 and the electrode 11 is inclined, the present disclosure is not limited to this. It is allowable to incline both of the ejecting head 10 and the electrode 11. In this case, it is allowable that both of the ejecting head 10 and the electrode 11 are inclined so that a spacing distance between an end in the moving direction Ds of the ejecting head 10 and an end in the moving direction of the electrode 11 becomes to be different from a spacing distance between the other end in the moving direction Ds of the ejecting head 10 and the other end in the moving direction of the electrode 11.

Further, in the above-described embodiment, although the electrode 11 is arranged in the inside of the cap 51, the present disclosure is not limited to this. It is allowable to arrange the electrode 11 separately from the cap 51.

Furthermore, in the above-described embodiment, although the convex-concave part 11*d* is formed on the entirety of the surface, of the electrode 11, on the side of the ejection surface NM from the viewpoint of preventing the liquid dripping of the ink droplet Id, the present disclosure is not limited to this. It is allowable to form, for example, a wall part surrounding an edge part on the upper surface of the electrode 11, etc.

Moreover, in the above-described embodiment, although the explanation has been given regarding the head lifting-lowering device 55, the electrode lifting-lowering device 56, the inclining device 57 and the driving device 58, it is allowable to provide at least one of the head lifting-lowering device 55, the electrode lifting-lowering device 56, the inclining device 57 and the driving device 58 in order to change the distance between the ejection surface NM of the ejecting head 10 and the electrode 11.

Further, in the above-described embodiment, although the ejecting head 10 constructed of the serial head is adopted, the present disclosure is not limited to this; it is allowable to use a line head as the ejecting head 10.

What is claimed is:

1. A liquid droplet ejecting apparatus comprising:

an ejecting head made of metal and having an ejection surface, the ejection surface being formed with a nozzle hole configured to cause a liquid droplet to be ejected onto a print medium;

an electrode configured to move relative to the ejection surface;

a voltage source configured to generate a potential difference between the ejecting head and the electrode;

an electric current detector configured to detect an electric current flowing between the ejecting head and the electrode; and a controller, wherein the controller is configured to:

calculate a flying speed of the liquid droplet based on a first distance between the ejecting head and the electrode and a time, during which the electric current flows in a case that the liquid droplet is ejected by the ejecting head in a state of the potential difference being generated by the voltage source between the ejecting head and the electrode; and calculate an ejection bending amount with respect to a normal flying direction of the liquid droplet, based on a time after the liquid droplet is ejected from the ejecting head in a state that the ejection surface and the electrode are apart from each other by a second distance greater than the first distance and until the liquid droplet lands on the electrode.

2. The liquid droplet ejecting apparatus according to claim 1, further comprising a head lifting-lowering device configured to lift and lower the ejecting head.

3. The liquid droplet ejecting apparatus according to claim 1, further comprising an electrode lifting-lowering device configured to lift and lower the electrode.

4. The liquid droplet ejecting apparatus according to claim 2, further comprising an electrode lifting-lowering device configured to lift and lower the electrode.

5. The liquid droplet ejecting apparatus according to claim 1, wherein the controller is configured to calculate the ejection bending amount in a case that a difference between the flying speed which has been calculated and a normal speed of the liquid droplet is not less than a threshold value.

6. The liquid droplet ejecting apparatus according to claim 1, wherein the controller is configured to calculate the flying speed in a case that the ejection bending amount which has been calculated is not less than a threshold value.

7. The liquid droplet ejecting apparatus according to claim 1, wherein a surface, of the electrode, on a side of the ejection surface is inclined with respect to the ejection surface.

8. The liquid droplet ejecting apparatus according to claim 1, wherein the electrode includes a conductive part and a non-conductive part which is adjacent to the conductive part.

9. The liquid droplet ejecting apparatus according to claim 8, wherein the controller is configured to detect a boundary point between the conductive part and the non-conductive part, as an origin of relative movement of the electrode relative to the ejection surface, before calculating the flying speed and the ejection bending amount.

10. The liquid droplet ejecting apparatus according to claim 1, wherein a surface, of the electrode, on a side of the ejection surface is formed to have an uneven shape with a concavity and a convexity.

11. The liquid droplet ejecting apparatus according to claim 1, further comprising:

a cap configured to cover the ejection surface of the ejecting head in a case that a printing on the print medium is not performed; and a driving device configured to move the cap such that the cap becomes to be parallel with respect to the ejection surface in a case of covering the ejection surface, wherein the electrode is formed in the cap.

12. The liquid droplet ejecting apparatus according to claim 1, wherein the controller is configured to control the ejecting head to eject a liquid droplet of a first volume and a liquid droplet of a second volume greater than the first volume from the nozzle hole, and the controller is configured to control the ejecting head to eject the liquid droplet of the second volume from the nozzle hole in a case of calculating the flying speed.

13. The liquid droplet ejecting apparatus according to claim 1, wherein the electrode is arranged horizontally, and the liquid droplet ejecting apparatus further comprises an inclining device configured to incline the ejecting head such that the ejection surface is inclined with respect to the electrode.

14. The liquid droplet ejecting apparatus according to claim 1, further comprising:

a carriage configured to move the ejecting head in a moving direction; and a driving device configured to relatively incline the electrode with respect to the ejection surface, wherein the controller is configured to calculate the flying speed and the ejection bending amount by controlling the ejecting head to eject the liquid droplet while controlling the ejecting head to move reciprocally in the moving direction in a state that the electrode is relatively inclined with respect to the ejecting surface by the driving device.

* * * * *